(12) United States Patent
Hoehn et al.

(10) Patent No.: US 8,936,716 B2
(45) Date of Patent: Jan. 20, 2015

(54) PROCESS FOR RECOVERING HYDROPROCESSED HYDROCARBONS WITH TWO STRIPPERS IN SERIES

(75) Inventors: Richard K. Hoehn, Mount Prospect, IL (US); Vedula K. Murty, Willowbrook, IL (US)

(73) Assignee: UOP LLC, Des Plaines, IL (US)

( * ) Notice: Subject to any disclaimer, the term of this patent is extended or adjusted under 35 U.S.C. 154(b) by 781 days.

(21) Appl. No.: 13/213,205

(22) Filed: Aug. 19, 2011

(65) Prior Publication Data

US 2013/0043159 A1    Feb. 21, 2013

(51) Int. Cl.
 *C10G 69/04* (2006.01)
 *C10G 65/12* (2006.01)
 *C10G 47/00* (2006.01)
 *C10G 45/00* (2006.01)

(52) U.S. Cl.
 CPC .............. *C10G 45/00* (2013.01); *C10G 47/00* (2013.01); *C10G 69/04* (2013.01)
 USPC .............. 208/61; 208/46; 208/209; 208/212; 208/308; 208/361

(58) Field of Classification Search
 CPC ........ C10G 45/00; C10G 45/02; C10G 47/00; C10G 67/00; C10G 67/02; C10G 69/04
 USPC ......... 208/49, 57, 58, 61, 100, 105, 209, 212, 208/308, 347, 369
 See application file for complete search history.

(56) References Cited

U.S. PATENT DOCUMENTS

| | | |
|---|---|---|
| 2,273,076 A | 2/1942 | Voorhees |
| 2,998,381 A | 8/1961 | Bushnell |
| 3,445,378 A | 5/1969 | De Graff |
| 3,574,090 A | 4/1971 | Hallman |
| 3,607,726 A | 9/1971 | Hallman |
| 3,719,027 A | 3/1973 | Salka |
| 3,733,260 A | 5/1973 | Davies et al. |
| 3,772,158 A | 11/1973 | Sarno |
| 4,016,070 A | 4/1977 | Christman et al. |
| 4,925,573 A | 5/1990 | Vorlow |
| 5,110,444 A | 5/1992 | Haun et al. |
| 5,120,427 A | 6/1992 | Stine et al. |
| 5,453,177 A | 9/1995 | Goebel et al. |
| 5,709,780 A | 1/1998 | Ognisty et al. |
| 5,720,872 A | 2/1998 | Gupta |
| 6,261,441 B1 | 7/2001 | Gentry et al. |
| 6,500,309 B1 | 12/2002 | Tung |
| 6,787,026 B2 | 9/2004 | Farshid |
| 7,282,138 B2 | 10/2007 | Ellis et al. |
| 7,462,276 B2 | 12/2008 | Wang et al. |

(Continued)

OTHER PUBLICATIONS

U.S. Appl. No. 13/213,310, filed Aug. 19, 2011, Hoehn.

(Continued)

*Primary Examiner* — Walter D Griffin
*Assistant Examiner* — Derek Mueller (57) ABSTRACT

A process is disclosed for recovering hydroprocessing effluent from a hydroprocessing unit utilizing a hot stripper and a cold stripper. A net overhead stream from the hot stripper is forwarded to the cold stripper for further stripping. The invention is particularly suitable for hydrotreating residue feed streams. The hot stripped stream may be subjected to fluid catalytic cracking. The apparatus and process eliminates the need for a fired heater in the product recovery unit.

19 Claims, 1 Drawing Sheet

(56) References Cited

U.S. PATENT DOCUMENTS

| | | |
|---|---|---|
| 7,528,290 B2 | 5/2009 | Zimmermann et al. |
| 2001/0047952 A1 | 12/2001 | Podrebarac et al. |
| 2007/0266853 A1 | 11/2007 | Prussner et al. |
| 2008/0230441 A1 | 9/2008 | Hunter et al. |
| 2009/0159493 A1 | 6/2009 | Bhattacharya |
| 2009/0214410 A1 | 8/2009 | Blanchard et al. |
| 2010/0329936 A1 | 12/2010 | Van Wees et al. |
| 2013/0045140 A1 | 2/2013 | Hoehn et al. |

OTHER PUBLICATIONS

U.S. Appl. No. 13/213,319, filed Aug. 19, 2011, Hoehn.
U.S. Appl. No. 13/213,327, filed Aug. 19, 2011, Hoehn.
U.S. Appl. No. 13/213,335, filed Aug. 19, 2011, Hoehn.
U.S. Appl. No. 13/213,357, filed Aug. 19, 2011, Hoehn.
U.S. Appl. No. 13/213,359, filed Aug. 19, 2011, Hoehn.
U.S. Appl. No. 13/213,225, filed Aug. 19, 2011, Hoehn.

PROCESS FOR RECOVERING HYDROPROCESSED HYDROCARBONS WITH TWO STRIPPERS IN SERIES

FIELD OF THE INVENTION

The field of the invention is the recovery of hydroprocessed hydrocarbon streams.

BACKGROUND OF THE INVENTION

Hydroprocessing can include processes which convert hydrocarbons in the presence of hydroprocessing catalyst and hydrogen to more valuable products.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst. Slurry hydrocracking is a slurried catalytic process used to crack residue feeds to gas oils and fuels.

Due to environmental concerns and newly enacted rules and regulations, saleable fuels must meet lower and lower limits on contaminates, such as sulfur and nitrogen. New regulations require essentially complete removal of sulfur from diesel. For example, the ultra low sulfur diesel (ULSD) requirement is typically less than about 10 wppm sulfur.

Hydrotreating is a hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking. Residue feed from the bottoms of an atmospheric crude column and/or the bottoms of a vacuum crude column may be hydrotreated to make it more suitable for fluid catalytic cracking or other upgrading processes. Diesel and naphtha are produced by hydrotreating residue and must be recovered to recoup value.

Hydroprocessing recovery units typically include a stripper for stripping hydroprocessed effluent with a stripping medium such as steam to remove unwanted hydrogen sulfide. The stripped effluent then is heated in a fired heater to fractionation temperature before entering a product fractionation column to recover products such as naphtha, kerosene and diesel.

Hydroprocessing is very energy-intensive due to the severe process conditions such as the high temperature and pressure used. Over time, although much effort has been spent on improving energy performance for hydroprocessing, the focus has been on reducing reactor heater duty. However, a large heater duty is required to heat stripped effluent before entering the product fractionation column.

There is a continuing need, therefore, for improved methods of recovering fuel products from hydroprocessed effluents. Such methods must be more energy efficient to meet the increasing needs of refiners.

BRIEF SUMMARY OF THE INVENTION

In a process embodiment, the invention comprises a hydroprocessing process comprising hydroprocessing a hydrocarbon feed in a hydroprocessing reactor to provide a hydroprocessing effluent stream. A relatively hot hydroprocessing effluent stream which is a portion of the hydroprocessing effluent stream is stripped in a hot stripper to provide a hot stripped stream. Lastly, a relatively cold hydroprocessing effluent stream which is a portion of the hydroprocessing effluent stream and a stream from the hot stripper are stripped in a cold stripper to provide a cold stripped stream.

In an additional process embodiment, the invention comprises a hydroprocessing product recovery process for recovering product from a relatively cold hydroprocessing effluent stream and a relatively hot hydroprocessing effluent stream comprising stripping the relatively hot hydroprocessing effluent stream in a hot stripper to provide a hot stripped stream. The relatively cold hydroprocessing effluent stream and a stream from the hot stripper are stripped in a cold stripper to provide a cold stripped stream.

In a further process embodiment, the invention comprises a hydroprocessing process comprising hydrotreating a hydrocarbon feed in a hydroprocessing reactor to provide a hydroprocessing effluent stream. A relatively hot hydroprocessing effluent stream which is a portion of the hydroprocessing effluent stream is stripped in a hot stripper to provide a hot stripped stream. A relatively cold hydroprocessing effluent stream which is a portion of the hydroprocessing effluent stream and a stream from the hot stripper are stripped in a cold stripper to provide a cold stripped stream. The hot stripped stream is fluid catalytically cracked. Lastly, the cold stripped stream is fractionated.

DEFINITIONS

Figure 1:
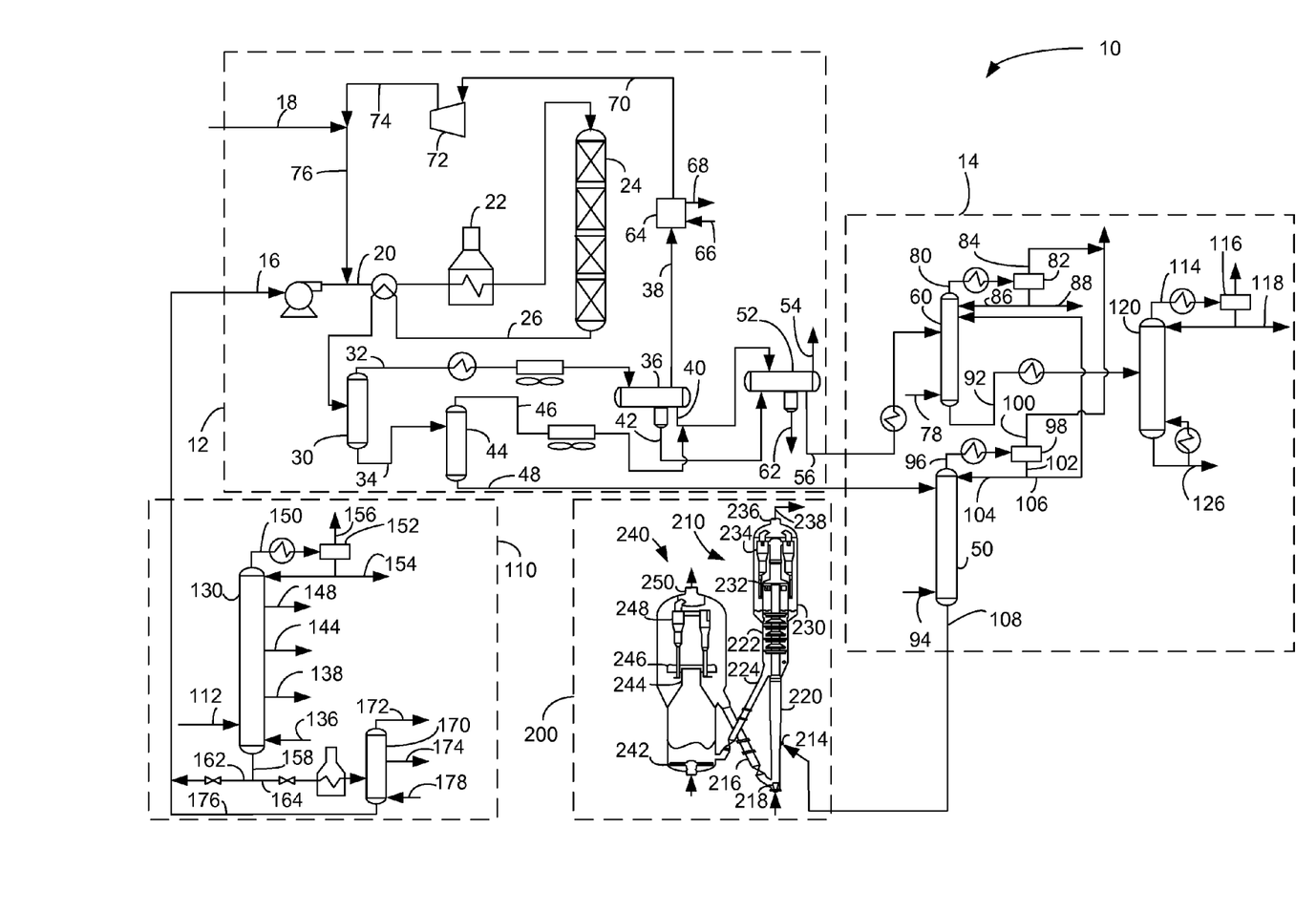
The FIGURE is a simplified process flow diagram of an embodiment of the present invention.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "conversion" means conversion of feed to material that boils at or below the diesel boiling range. The diesel cut point of the diesel boiling range is between about 343° and about 399° C. (650° to 750° F.) using the True Boiling Point distillation method.

As used herein, the term "diesel boiling range" means hydrocarbons boiling in the range of between about 132° and about 399° C. (270° to 750° F.) using the True Boiling Point distillation method.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

DETAILED DESCRIPTION

Traditional hydroprocessing design features one stripper which receives two feeds, a relatively cold hydroprocessed effluent stream which may be from a cold flash drum and a relatively hot hydroprocessed effluent stream which may be from a hot flash drum. Although these two feeds contain very different compositions, they can be traced back to the same location from a hydroprocessing reactor and perhaps, a hot separator. An overhead vapor stream of the hot separator may go to a cold separator and the liquid from the cold separator may go to a cold flash drum while a bottoms liquid of the hot separator may go to a hot flash drum. Traditionally, the liquid of both hot and cold flash drums are fed to a single stripper. A stripper bottoms stream may become the feed for the product fractionation column. The inefficiency of this one-stripper design is rooted in mixing of the liquids of the hot flash drum and the cold flash drum in the same stripper which partially undoes the separation previously accomplished in the hot separator and thus requires duplicative heating in a fired heater to the product fractionation column.

Applicants propose to use two strippers, namely a hot stripper which is used for the hot hydroprocessed effluent stream which may be liquid from the hot flash drum and a cold stripper which is used for the cold hydroprocessed effluent stream which may be liquid from the cold flash drum.

In the aspect of hydrotreating atmospheric and/or vacuum residue, some light hydrocarbons such as diesel and lighter are produced. The amount of diesel and lighter hydrocarbons produced is not large compared with the amount of desulfurized residue product, but in some cases it may be economical to recover this material. The conventional method uses a single stripper as described above and all the stripped material is heated in a product fractionation feed heater to vaporize the diesel and lighter material so it can be separated in the product fractionation column. This results in a large fired heater duty for the product fractionation feed heater, since a substantial amount of heat is taken up with the sensible heating of the desulfurized atmospheric and/or vacuum residue. It is highly desirable to avoid the cost of heating this material unnecessarily.

The present invention which uses two strippers instead of one accomplishes substantially the same processing objectives as the conventional one-stripper design, but does not incur nearly as high an energy cost, because the desulfurized atmospheric and vacuum residue are not heated after stripping. A substantial portion of the distillate and lighter material is still recovered, while minimizing the capital and utilities costs.

In the aspect of the hydroprocessing unit being a residue hydrotreating unit, the hot hydroprocessed effluent, which contains all of the desulfurized atmospheric and vacuum residue product is fed to a hot stripper, which removes the hydrogen sulfide and as much of the diesel and lighter material consistent with maintaining the endpoint specification of the diesel product. In such an aspect, the hot stripper bottoms can bypass the product fractionation column and be processed in an upgrading unit such as a fluid catalytic cracking unit. Consequently, the fired heater in the product recovery unit is eliminated altogether.

The net overhead from the hot stripper may be fed to a cold stripper along with the cold hydroprocessed effluent, which contains mainly the diesel and lighter hydrocarbons. In the cold stripper the hydrogen sulfide and hydrocarbons boiling in the naphtha and lighter range are removed overhead. In addition, the hot separator is operated in such a manner so as to limit the endpoint of the diesel product produced in the bottoms of the cold stripper. The bottoms of the cold stripper can either be routed to another unit for further processing, or sent to a product fractionation column which may be a naphtha splitter column, where additional naphtha can be produced overhead and a bottoms product, which is diesel range material, may be recovered. Since it is expected that the diesel produced in the residue hydrotreating unit is not ultra low sulfur diesel (ULSD), further processing may be required. Consequently, the diesel material may be directed to a distillate hydrotreating unit for further sulfur reduction and, if necessary, this treating would include adjustment of certain properties, such as cetane number increase, pour point reduction or other upgrade processing.

The apparatus and process 10 for hydroprocessing hydrocarbons comprise a hydroprocessing unit 12 and a product recovery unit 14. A hydrocarbon stream in hydrocarbon line 16 and a make-up hydrogen stream in hydrogen make-up line 18 are fed to the hydroprocessing unit 12. Hydroprocessing effluent is fractionated in the product recovery unit 14. The apparatus and process 10 may also include a crude fractionation unit 110 and/or a fluid catalytic cracking unit 200.

A hydrogen stream in hydrogen line 76 supplemented by make-up hydrogen from line 18 may join the hydrocarbon feed stream in feed line 16 to provide a hydroprocessing feed stream in feed line 20. The hydroprocessing feed stream in line 20 may be heated by heat exchange and in a fired heater 22 and fed to the hydroprocessing reactor 24.

In one aspect, the process and apparatus described herein are particularly useful for hydroprocessing a hydrocarbonaceous feedstock. Illustrative hydrocarbon feedstocks include hydrocarbonaceous streams having components boiling above about 288° C. (550° F.), such as atmospheric gas oils, vacuum gas oil (VGO) boiling between about 315° C. (600° F.) and about 565° C. (1050° F.), deasphalted oil, coker distillates, straight run distillates, pyrolysis-derived oils, high boiling synthetic oils, cycle oils, hydrocracked feeds, catalytic cracker distillates, atmospheric residue boiling at or above about 343° C. (650° F.) and vacuum residue boiling above about 510° C. (950° F.).

In an aspect, the feed in line 16 may be a residue feed. In this aspect, crude oil feed may be processed in a crude fractionation unit 110. The crude oil feed enters the crude fractionation unit 110 in line 112 and may pass through a series of heat exchangers (not shown) that transfer heat to the crude oil suitably from the products of an atmospheric distillation column 130. The oil is transferred in line 112 to a bottom of the atmospheric distillation column 130. An inert stripping medium such as steam is added to the distillation column 130 in line 136 to provide heating requirements and to strip lighter components from heavier components in the column. Various distillation products are withdrawn from the atmospheric distillation column 130 and may be stripped in side columns with more stripping media to remove and return lighter components from net product streams to the column 130. An atmospheric gas oil stream is withdrawn near a bottom of the atmospheric distillation column in line 138. A diesel stream is withdrawn near a middle of the atmospheric distillation column 130 in line 144. A cut of kerosene is withdrawn near a top of the atmospheric distillation column 130 in line 148. A portion of the kerosene stream withdrawn from the column may be reboiled and returned to the column while a net kerosene stream is removed in line 148. A cut of naphtha and lighter hydrocarbons is withdrawn from the overhead of the atmospheric distillation column 130 in line 150 and cooled or condensed by cooler and transported to a receiver 152. A portion of the liquid from the receiver 152 is returned to the atmospheric distillation column 130, and another portion is recovered in line 154. Hydrocarbon gases lighter than naphtha are withdrawn from the receiver 152 in line 156. An atmospheric residue stream is withdrawn from the bottom of atmospheric distillation column 130 in a bottoms line 158. The atmospheric residue stream in bottoms line 158 may provide feed stream 16 via line 162 and regulated by a control valve thereon.

In a further aspect, a portion of the atmospheric residue stream in bottoms line 158 may be heated and fed via line 164 to a vacuum column 170 operated at sub-atmospheric pressure. A control valve on line 164 regulates flow therethrough. An off-gas stream may be recovered from the vacuum column 170 in an overhead line 172. A vacuum gas oil stream may be recovered in a side cut line 174. A vacuum residue stream may be recovered from the bottom in a bottoms line 176 and provide a part of feed stream 16. Inert stripping media such as steam in line 178 may be introduced into the bottom of the vacuum column to provide heat requirements and effect separation. Use of a reboiler is also contemplated.

Hydroprocessing that occurs in the hydroprocessing unit 12 may be hydrocracking or hydrotreating. Hydrocracking refers to a process in which hydrocarbons crack in the presence of hydrogen to lower molecular weight hydrocarbons. Hydrocracking also includes slurry hydrocracking in which residue feed is mixed with catalyst and hydrogen to make a slurry and cracked to lower boiling products. VGO in the products may be recycled to manage coke precursors referred to as mesophase.

Hydroprocessing that occurs in the hydroprocessing unit may also be hydrotreating. Hydrotreating is a process wherein hydrogen is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. The cloud point of the hydrotreated product may also be reduced.

Hydrotreating is the preferred process in the hydroprocessing unit 12 especially when the hydroprocessing unit is processing residue feed in line 16. Consequently, the term "hydroprocessing" will include the term "hydrotreating" herein.

The hydroprocessing reactor 24 may be a fixed bed reactor that comprises one or more vessels, single or multiple beds of catalyst in each vessel, and various combinations of hydrotreating catalyst and/or hydrocracking catalyst in one or more vessels. It is contemplated that the hydroprocessing reactor 24 be operated in a continuous liquid phase in which the volume of the liquid hydrocarbon feed is greater than the volume of the hydrogen gas. The hydroprocessing reactor 24 may also be operated in a conventional continuous gas phase, a moving bed or a fluidized bed hydroprocessing reactor.

If the hydroprocessing reactor 24 is operated as a hydrotreating reactor, it may provide conversion per pass of about 10 to about 30 vol-%. If the hydroprocessing reactor 24 is operated as a residue hydrotreating reactor, it may provide conversion per pass of about 10 to about 20 vol-%.

If the hydroprocessing reactor 24 is operated as a hydrocracking reactor, it may provide total conversion of at least about 20 vol-% and typically greater than about 60 vol-% of the hydrocarbon feed to products boiling below the diesel cut point. A hydrocracking reactor may operate at partial conversion of more than about 50 vol-% or full conversion of at least about 90 vol-% of the feed based on total conversion. A hydrocracking reactor may be operated at mild hydrocracking conditions which will provide about 20 to about 60 vol-%, preferably about 20 to about 50 vol-%, total conversion of the hydrocarbon feed to product boiling below the diesel cut point.

If the hydroprocessing reactor 24 is a hydrocracking reactor, the first vessel or bed in the hydrocracking reactor 24 may include hydrotreating catalyst for the purpose of saturating, demetallizing, desulfurizing or denitrogenating the hydrocarbon feed before it is hydrocracked with hydrocracking catalyst in subsequent vessels or beds in the hydrocracking reactor 24. If the hydrocracking reactor is a mild hydrocracking reactor, it may contain several beds of hydrotreating catalyst followed by a fewer beds of hydrocracking catalyst. If the hydroprocessing reactor 24 is a slurry hydrocracking reactor, it may operate in a continuous liquid phase in an upflow mode and will appear different than in the FIGURE which depicts a fixed bed reactor. If the hydroprocessing reactor 24 is a hydrotreating reactor it may comprise more than one vessel and multiple beds of hydrotreating catalyst. The hydrotreating reactor may also contain hydrotreating catalyst that is suited for saturating aromatics, hydrodewaxing and hydroisomerization.

A hydrocracking catalyst may utilize amorphous silica-alumina bases or low-level zeolite bases combined with one or more Group VIII or Group VIB metal hydrogenating components if mild hydrocracking is desired to produce a balance of middle distillate and gasoline. In another aspect, when middle distillate is significantly preferred in the converted product over gasoline production, partial or full hydrocracking may be performed in the first hydrocracking reactor 24 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms ($10^{-10}$ meters), wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 percent, and preferably at least about 20 percent, metal-cation-deficient, based on the initial ion-exchange capacity. In another aspect, a desirable and stable class of zeolites is one wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and about 30 percent by weight may be used. In the case of the noble metals, it is normally preferred to use about 0.05 to about 2 wt-%.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., about 371° to about 648° C. (about 700° to about 1200° F.) in order to activate the catalyst and decompose ammonium ions. Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt-%. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 290° C. (550° F.) to about 468° C. (875° F.), preferably 343° C. (650° F.) to about 445° C. (833° F.), a pressure from about 4.8 MPa (gauge) (700 psig) to about 20.7 MPa (gauge) (3000 psig), a liquid hourly space velocity (LHSV) from about 0.4 to less than about 2.5 $hr^{-1}$ and a hydrogen rate of about 421 (2,500 scf/bbl) to about 2,527 $Nm^3/m^3$ oil (15,000 scf/bbl). If mild hydrocracking is desired, conditions may include a temperature from about 315° C. (600° F.) to about 441° C. (825° F.), a pressure from about 5.5 MPa (gauge) (800 psig) to about 13.8 MPa (gauge) (2000 psig) or more typically about 6.9 MPa (gauge) (1000 psig) to about 11.0 MPa (gauge) (1600 psig), a liquid hourly space velocity (LHSV) from about 0.5 to about 2 $hr^{-1}$ and preferably about 0.7 to about 1.5 $hr^{-1}$ and a hydrogen rate of about 421 $Nm^3/m^3$ oil (2,500 scf/bbl) to about 1,685 $Nm^3/m^3$ oil (10,000 scf/bbl).

Slurry hydrocracking catalyst are typically ferrous sulfate hydrates having particle sizes less than 45 μm and with a major portion, i.e. at least 50% by weight, in an aspect, having particle sizes of less than 10 μm. Iron sulfate monohydrate is a suitable catalyst. Bauxite catalyst may also be suitable. In an aspect, 0.01 to 4.0 wt-% of catalyst based on fresh feedstock are added to the hydrocarbon feed. Oil soluble catalysts may be used alternatively or additionally. Oil soluble catalysts include metal naphthenate or metal octanoate, in the range of 50-1000 wppm based on fresh feedstock. The metal may be molybdenum, tungsten, ruthenium, nickel, cobalt or iron.

A slurry hydrocracking reactor may be operated at a pressure, in an aspect, in the range of 3.5 MPa (gauge) (508 psig) to 24 MPa (gauge) (3,481 psig), without coke formation in the reactor. The reactor temperature may be in the range of about 350° to 600° C. with a temperature of about 400° to 500° C. being typical. The LHSV is typically below about 4 $h^{-1}$ on a fresh feed basis, with a range of about 0.1 to 3 $hr^{-1}$ being suitable and a range of about 0.2 to 1 $hr^{-1}$ being particularly suitable. The per-pass pitch conversion may be between 50 and 95 wt-%. The hydrogen feed rate may be about 674 to about 3370 $Nm^3/m^3$ (4000 to about 20,000 SCF/bbl) oil. An antifoaming agent may also be added to the slurry hydrocracking reactor 24, in an aspect, to the top thereof, to reduce the tendency to generate foam.

The hydroprocessing reactor 24 may be operated as a hydrotreating reactor. In the aspect of the feed stream in line 16 being a residue feed, the hydroprocessing reactor 24 may be a hydrotreating reactor 24 which may be in downstream communication with a bottoms line 158 of the atmospheric crude fractionation column 130 and/or bottoms line 176 of the vacuum fractionation column 170.

Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present invention that more than one type of hydrotreating catalyst be used in the same hydrotreating reactor 96. The Group VIII metal is typically present in an amount ranging from about 2 to about 20 wt-%, preferably from about 4 to about 12 wt-%. The Group VI metal will typically be present in an amount ranging from about 1 to about 25 wt-%, preferably from about 2 to about 25 wt-%.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.1 MPa (gauge) (300 psig), preferably 4.1 MPa (gauge) (600 psig) to about 12.4 MPa (gauge) (1800 psig), preferably 6.9 MPa (gauge) (1000 psig), a liquid hourly space velocity of the fresh hydrocarbonaceous feedstock from about 0.5 hr$^{-1}$ to about 4 hr$^{-1}$, preferably from about 1.5 to about 3.5 hr$^{-1}$, and a hydrogen rate of about 168 Nm$^3$/m$^3$ (1,000 scf/bbl), to about 1,011 Nm$^3$/m$^3$ oil (6,000 scf/bbl), preferably about 168 Nm$^3$/m$^3$ oil (1,000 scf/bbl) to about 674 Nm$^3$/m$^3$ oil (4,000 scf/bbl), with a hydrotreating catalyst or a combination of hydrotreating catalysts. For residue hydrotreating, the pressure may be as high as 20.6 MPa (gauge) (3000 psig), a liquid hourly space velocity of the fresh hydrocarbonaceous feedstock may range from about 0.1 hr$^{-1}$ to about 1 hr$^{-1}$, preferably from about 0.15 to about 0.5 hr$^{-1}$ and the hydrogen rate may preferably range between about 168 Nm$^3$/m$^3$ oil (1,000 scf/bbl) to about 674 Nm$^3$/m$^3$ oil (5,000 scf/bbl).

A hydroprocessing effluent exits the hydroprocessing reactor 24 and is transported in hydroprocessing effluent line 26. The hydroprocessing effluent comprises material that will become a relatively cold hydroprocessing effluent stream and a relatively hot hydroprocessing effluent stream. The hydroprocessing unit may comprise one or more separators for separating the hydroprocessing effluent stream into a cold hydroprocessing effluent stream and hot hydroprocessing effluent stream.

The hydroprocessing effluent in hydroprocessing effluent line 26 may in an aspect be heat exchanged with the hydroprocessing feed stream in line 20 to be cooled before entering a hot separator 30. The hot separator separates the hydroprocessing effluent to provide a vaporous hydrocarbonaceous hot separator overhead stream in an overhead line 32 comprising a portion of a cold hydroprocessed effluent stream and a liquid hydrocarbonaceous hot separator bottoms stream in a bottoms line 34 comprising a portion of a cold hydroprocessed effluent stream and still a portion of a hot hydroprocessed effluent stream. The hot separator 30 in the hydroprocessing section 12 is in downstream communication with the hydroprocessing reactor 24. When the hydroprocessing unit 12 operates to hydrotreat residue feed, the hot separator 30 may be operated at conditions to limit the endpoint of the diesel product produced in the bottoms of a cold stripper column 60. The hot separator 30 may be operated at about 177° C. (350° F.) to about 371° C. (700° F.) and preferably operates at about 232° C. (450° F.) to about 315° C. (600° F.). The hot separator 30 may be operated at a slightly lower pressure than the hydroprocessing reactor 24 accounting for pressure drop of intervening equipment. The hot separator may be operated at pressures between about 3.4 MPa (gauge) (493 psig) and about 20.4 MPa (gauge) (2959 psig).

The vaporous hydrocarbonaceous hot separator overhead stream in the overhead line 32 may be cooled before entering a cold separator 36. As a consequence of the reactions taking place in the hydroprocessing reactor 24 wherein nitrogen, chlorine and sulfur are removed from the feed, ammonia and hydrogen sulfide are formed. At a characteristic temperature, ammonia and hydrogen sulfide will combine to form ammonium bisulfide and ammonia and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the line 32 transporting the hot separator overhead stream, a suitable amount of wash water (not shown) may be introduced into line 32 upstream at a point in line 32 where the temperature is above the characteristic sublimation temperature of either compound.

The cold separator 36 serves to separate hydrogen from hydrocarbon in the hydroprocessing effluent for recycle to the hydroprocessing reactor 24 in the overhead line 38. The vaporous hydrocarbonaceous hot separator overhead stream may be separated in the cold separator 36 to provide a vaporous cold separator overhead stream comprising a hydrogen-rich gas stream in an overhead line 38 and a liquid cold separator bottoms stream in the bottoms line 40 comprising a portion of the cold hydroprocessing effluent stream. The cold separator 36, therefore, is in downstream communication with the overhead line 32 of the hot separator 30 and the hydroprocessing reactor 24. The cold separator 36 may be operated at about 100° F. (38° C.) to about 150° F. (66° C.), suitably about 115° F. (46° C.) to about 145° F. (63° C.), and just below the pressure of the hydroprocessing reactor 46 and the hot separator 30 accounting for pressure drop of intervening equipment to keep hydrogen and light gases in the overhead and normally liquid hydrocarbons in the bottoms. The cold separator may be operated at pressures between about 3 MPa (gauge) (435 psig) and about 20 MPa (gauge) (2901 psig). The cold separator 36 may also have a boot for collecting an aqueous phase in line 42.

The liquid hydrocarbonaceous stream in the hot separator bottoms line 34 may be fractionated as hot hydroprocessing effluent stream in the product recovery unit 14. In an aspect, the liquid hydrocarbonaceous stream in the bottoms line 34 may be let down in pressure and flashed in a hot flash drum 44 to provide a hot flash overhead stream of light ends in an overhead line 46 comprising a portion of the cold hydroprocessed effluent stream and a heavy liquid stream in a bottoms line 48 comprising at least a portion of the hot hydroprocessed effluent stream. The hot flash drum 44 may be any separator that splits the liquid hydroprocessing effluent into vapor and liquid fractions. The hot flash drum 44 may be operated at the same temperature as the hot separator 30 but at a lower pressure of between about 2.1 MPa (gauge) (300 psig) and about 6.9 MPa (gauge) (1000 psig), suitably less than about 3.4 MPa (gauge) (500 psig). The heavy liquid stream in bottoms line 48 may be further fractionated in the product recovery unit 14. In an aspect, the heavy liquid stream in bottoms line 48 may be introduced into a hot stripper 50 and comprise at least a portion, and suitably all, of a relatively hot hydroprocessing effluent stream. The hot stripper 50 is in downstream communication with a bottom of the hot flash drum 44 via bottoms line 48.

In an aspect, the liquid hydroprocessing effluent stream in the cold separator bottoms line 40 may be fractionated as a cold hydroprocessing effluent stream in the product recovery unit 14. In a further aspect, the cold separator liquid bottoms stream may be let down in pressure and flashed in a cold flash drum 52 to separate the cold separator liquid bottoms stream in bottoms line 40. The cold flash drum 52 may be any separator that splits hydroprocessing effluent into vapor and liquid fractions. The cold flash drum may be in communication with a bottom of the cold separator 36 via bottoms line 40. A cold stripper 60 may be in downstream communication with a bottoms line 56 of the cold flash drum 52.

In a further aspect, the vaporous hot flash overhead stream in overhead line 46 may be fractionated as a cold hydroprocessing effluent stream in the product recovery unit 14. In a further aspect, the hot flash overhead stream may be cooled and also separated in the cold flash drum 52. The cold flash drum 52 may separate the cold separator liquid bottoms stream in line 40 and hot flash vaporous overhead stream in overhead line 46 to provide a cold flash overhead stream in overhead line 54 and a cold flash bottoms stream in a bottoms line 56 comprising at least a portion of a cold hydroprocessed effluent stream. The cold flash bottoms stream in bottoms line 56 comprises at least a portion, and suitably all, of the cold hydroprocessed effluent stream. In an aspect, the cold stripper 60 is in downstream communication with the cold flash drum 52 via bottoms line 56. The cold flash drum 52 may be in downstream communication with the bottoms line 40 of the cold separator 50, the overhead line 46 of the hot flash drum 44 and the hydroprocessing reactor 24. The cold separator bottoms stream in bottoms line 40 and the hot flash overhead stream in overhead line 46 may enter into the cold flash drum 52 either together or separately. In an aspect, the hot flash overhead line 46 joins the cold separator bottoms line 40 and feeds the hot flash overhead stream and the cold separator bottoms stream together to the cold flash drum 52. The cold flash drum 52 may be operated at the same temperature as the cold separator 50 but typically at a lower pressure of between about 2.1 MPa (gauge) (300 psig) and about 7.0 MPa (gauge) (1000 psig) and preferably no higher than 3.1 MPa (gauge) (450 psig). The aqueous stream in line 42 from the boot of the cold separator may also be directed to the cold flash drum 52. A flashed aqueous stream is removed from a boot in the cold flash drum 52 in line 62.

The vaporous cold separator overhead stream comprising hydrogen in the overhead line 38 is rich in hydrogen. The cold separator overhead stream in overhead line 38 may be passed through a trayed or packed scrubbing tower 64 where it is scrubbed by means of a scrubbing liquid such as an aqueous amine solution in line 66 to remove hydrogen sulfide and ammonia. The spent scrubbing liquid in line 68 may be regenerated and recycled back to the scrubbing tower 64. The scrubbed hydrogen-rich stream emerges from the scrubber via line 70 and may be compressed in a recycle compressor 72 to provide a recycle hydrogen stream in line 74 which is a compressed vaporous hydroprocessing effluent stream. The recycle compressor 72 may be in downstream communication with the hydroprocessing reactor 24. The recycle hydrogen stream in line 74 may be supplemented with make-up stream 18 to provide the hydrogen stream in hydrogen line 76. A portion of the material in line 74 may be routed to the intermediate catalyst bed outlets in the hydroprocessing reactor 24 to control the inlet temperature of the subsequent catalyst bed (not shown).

The product recovery unit 14 may include a hot stripper 50, a cold stripper 60 and a product fractionation column 120. The cold stripper 60 is in downstream communication with the hydroprocessing reactor 24 for stripping the relatively cold hydroprocessing effluent stream which is a portion of the hydroprocessing effluent stream in hydroprocessing effluent line 26, and the hot stripper is in downstream communication with the hydroprocessing reactor 24 for stripping the relatively hot hydroprocessing effluent stream which is also a portion of the hydroprocessing effluent stream in hydroprocessing effluent line 26. In an aspect, the cold hydroprocessing effluent stream is the cold flash bottoms stream in bottoms line 56 and the hot hydroprocessing effluent stream is the hot flash bottoms stream in bottoms line 48, but other sources of these streams are contemplated.

The hot hydroprocessing effluent stream which may be in the hot flash bottoms line 48 may be fed to the hot stripper column 50 near the top thereof. The hot hydroprocessing effluent stream which comprises at least a portion of the liquid hydroprocessing effluent may be stripped in the hot stripper column 50 with a hot stripping media which is an inert gas such as steam from line 94 to provide a hot vapor overhead stream in an overhead line 96. Stripping media is typically medium pressure steam and the label of hot and cold with respect to stripping media does not indicate relative temperature. At least a portion of the hot vapor stream may be condensed and separated in a hot overhead receiver 98. The hot overhead receiver 98 is in downstream communication with the overhead line 96 of the hot stripper column 50. The hot overhead receiver 98 separates the hot vapor overhead stream of the hot stripper into an off-gas stream and a bottoms stream. An overhead line 100 from the receiver 98 carries vaporous off-gas stream for further treating. A bottoms stream of unstabilized liquid materials from the bottoms of the receiver 98 in a bottoms line 102 may be split between a reflux portion in line 104 refluxed to the top of the hot stripper column 50 and a process portion which may be transported in process line 106 to the cold stripper column 60.

The hydroprocessing unit 12 may operate as a residue hydrotreating unit if the hydroprocessing feed in line 16 comprises residue and the hydroprocessing reactor 24 is a hydrotreating reactor. In this aspect, the hot hydroprocessing effluent stream in line 48 may contain all of the desulfurized residue product. In this aspect, the function of the hot stripper 50 is to remove the hydrogen sulfide and as much of the diesel and lighter material consistent with maintaining the endpoint specification of the diesel product. In this aspect, the hot vapor overhead stream in an overhead line 96 will comprise diesel, naphtha, hydrogen, hydrogen sulfide, steam and other gases and the bottoms stream from the bottoms of the receiver 98 in a bottoms line 102 will comprise unstabilized liquid diesel, naphtha and lighter materials.

The hot stripper column 50 may be operated with a bottoms temperature between about 160° C. (320° F.) and about 360° C. (680° F.) and an overhead pressure of about 0.5 MPa (gauge) (73 psig) to about 2.0 MPa (gauge) (292 psig). The temperature in the overhead receiver 98 ranges from about 38° C. (100° F.) to about 66° C. (150° F.) and the pressure is essentially the same as in the overhead of the hot stripper column 50.

In an aspect, the cold stripper column 60 may be in downstream communication with the hot stripper column 50 to strip a stream from the hot stripper column 50. In other words, the cold stripper column is in series with the hot stripper column 50. In an additional aspect, the cold stripper is in downstream communication with the overhead line 96 of the hot stripper column 50, so the stream from the hot stripper column 50 stripped in the cold stripper column 60 is at least a portion of an overhead stream from the hot stripper column 50 in overhead line 96. In a further aspect, the cold stripper column 60 is in downstream communication with a bottoms line 102 from the hot overhead receiver 98. By stripping the hot receiver bottoms stream of unstabilized liquid materials which includes hydrogen sulfide in process line 106 in the cold stripper column 60, diesel materials will go to the bottoms of the cold stripper column 60 and separate from the hydrogen sulfide which will go to the overhead of the cold stripper column 60. It is also contemplated that the hot stripper column 50 may be in downstream communication with the cold stripper column 60 to strip a stream from the cold stripper column 60.

A hydroprocessed, hot stripped stream is produced in bottoms line 108 of the hot stripper column 50. At least a portion of the hot stripped stream in bottoms line 108 may be further processed such as being fed to a fluid catalytic cracking unit 200. Consequently, the fluid catalytic cracking unit may be in downstream communication with the bottoms line 108 of the hot stripper.

The cold hydroprocessing effluent stream which in an aspect may be in the cold flash bottoms line 56 may be heated and fed to the cold stripper column 60 near the top of the column. An inlet for the process line 106 in downstream communication with the bottoms line 102 from the hot overhead receiver 98 to the cold stripper column 60 may be at a higher elevation than an inlet for the cold hydroprocessing effluent stream in line 56. The cold hydroprocessing effluent stream which comprises at least a portion of the liquid hydroprocessing effluent may be stripped along with the process stream from the hot stripper column 50 in the cold stripper column 60 with a cold stripping media which is an inert gas such as steam from a cold stripping media line 78. Stripping media is typically medium pressure steam and the label of hot and cold with respect to stripping media does not indicate relative temperature.

In an aspect, when the hydroprocessing unit 12 hydrotreats residue feed, both feeds to the cold stripper 60 of hot receiver bottoms in process line 106 and cold hydroprocessed effluent in line 56 may comprise diesel and lighter hydrocarbons, so they may be stripped together to provide a cold vapor stream of naphtha, hydrogen, hydrogen sulfide, steam and other gases in an overhead line 80.

A cold overhead receiver 82 is in downstream communication with an overhead line 80. At least a portion of the cold vapor stream may be condensed and separated in the cold overhead receiver 82. The cold overhead receiver 82 separates the cold overhead stream in overhead line 80 from the cold stripper column 60 into an off gas stream in overhead line 84 and a liquid unstabilized liquid stream. The overhead line 84 from the receiver 82 carries vaporous off gas for further treating. The vaporous off gas from the cold overhead receiver 82 in overhead line 84 may be mixed with the vaporous off gas from the hot overhead receiver 98 in the overhead line 100 to be further processed together since these streams may have similar compositions. Consequently, an overhead line 84 from the cold overhead receiver 82 may join with an overhead line 100 from the hot overhead receiver 98.

Unstabilized liquid from the bottoms of the receiver 82 may be split between a reflux portion in line 86 refluxed to the top of the cold stripper column 60 and a product portion which may be transported in product line 88 to further fractionation such as in a fractionation column (not shown). The cold stripper column 60 may be operated with a bottoms temperature between about 149° C. (300° F.) and about 260° C. (500° F.) and an overhead pressure of about 0.5 MPa (gauge) (73 psig) to about 2.0 MPa (gauge) (290 psig). The temperature in the overhead receiver 82 ranges from about 38° C. (100° F.) to about 66° C. (150° F.) and the pressure is essentially the same as in the overhead of the cold stripper column 60.

In the aspect of the hydroprocessing unit 12 operating as a residue hydrotreating unit, naphtha and lighter materials will be recovered in the cold overhead line 80 and the split in the cold overhead receiver 82 will be between naphtha and lighter materials. Unstabilized naphtha in line 88 may be further fractionated to remove gases from the naphtha.

A hydroprocessed cold stripped stream in bottoms line 92 may be routed to further processing. In an aspect, the cold stripped stream in bottom line 92 may be heated with a process heater that is less intensive than a fired heater and fed to the product fractionation column 120. Consequently, the product fractionation column 120 is in direct downstream communication with the bottoms line 92 of the cold stripper column 60 but is out of direct communication with the hot stripper column 50. In other words, in an aspect, the bottoms stream 92 flows to the product fractionation column 120, but no stream from the hot stripper column 50 flows to the product fractionation column 120 without first passing through another unit operation such as through the cold stripper column 60. The cold stripped stream in bottoms line 92 is fractionated in the product fractionation column 120, but the hot stripped stream in bottoms line 108 is not fractionated in the product fractionation column 120. The cold stripped stream may be heat exchanged with a bottoms stream in bottoms line 126 from the product fractionation column 90 or other suitable stream before entering the product fractionation column 120.

The product fractionation column 120 may be in downstream communication with the cold stripper column 60 for separating stripped streams into product streams. An overhead stream in line 114 may be condensed and separated in a receiver 116 with a portion of the liquid from a bottoms of the receiver 116 being refluxed back to the product fractionation column 120. The remaining liquid from the bottoms of the receiver 116 provides a net liquid stream produced in a liquid line 118.

A bottoms stream from the product fractionation column may be split between a net bottoms stream in bottoms line 126 and a portion that is reboiled and returned to the column. Stripping with inert media is also contemplated for the product fractionation column 120.

The product fractionation column 120 may be operated with a bottoms temperature between about 288° C. (550° F.) and about 370° C. (700° F.), preferably about 343° C. (650° F.) and at an overhead pressure between about 30 kPa (gauge) (4 psig) to about 200 kPa (gauge) (29 psig). Sour water streams may be collected from boots (not shown) of overhead receivers 82, 98 and 116.

In the aspect of the hydroprocessing unit 12 operating as a residue hydrotreating unit, the product fractionation column 120 may be a splitter column which produces a naphtha stream in the overhead and diesel stream in the bottoms. The overhead stream in line 114 would comprise naphtha. The remaining liquid from the bottoms of the receiver 116 provides a net naphtha stream in line 118. The net naphtha stream in line 118 may require further processing such as in a naphtha splitter column before blending in the gasoline pool. A bottoms stream from the product fractionation column may be split between a net diesel stream in diesel line 126 and a portion that is reboiled and returned to the column. The net diesel produced in line 120 would not be ULSD and may be directed to a distillate hydrotreating unit (not shown) for further sulfur removal and perhaps adjustment of cetane number, pour point or other properties.

The hydroprocessed hot stripped stream produced in bottoms line 108 of the hot stripper column 50 may be further processed in a fluid catalytic cracking unit 200 especially when the hydroprocessing unit 12 is operated to hydrotreat residue feed. It is also contemplated the hot stripped stream be subjected to further hydroprocessing. The fluid catalytic cracking unit 200 includes a reactor 210 and a catalyst regenerator 240. Suitable catalysts are those typically used in the art of fluid catalytic cracking, such as an active amorphous clay-type catalyst and/or a high activity, crystalline molecular sieves. Molecular sieve catalysts are preferred over amorphous catalysts because of their much-improved selectivity to desired products. Zeolites are the most commonly used molecular sieves in fluid catalytic cracking processes. A large pore zeolite, such as a Y-type zeolite, bound on an active alumina material is preferred. Process variables typically include a cracking reaction temperature of about 400 to about 600° C. and a catalyst regeneration temperature of about 500 to about 900° C. Both the cracking and regeneration occur at an absolute pressure below about 0.5 MPa. The hot stripped stream in line 108 is distributed by distributor 214 into the riser 220 and contacted with a stream of fluidized, newly regenerated hot cracking catalyst entering from a regenerated catalyst standpipe 216. This contacting may occur in a narrow reactor riser 220, extending upwardly to the bottom of a reactor vessel 230. The even contacting of feed and catalyst may be assisted by gas such as steam from a fluidizing gas distributor 218. Heat from the regenerated catalyst vaporizes the feed and is thereafter cracked to lighter molecular weight hydrocarbons in the presence of the catalyst as both are transferred up the reactor riser 220 into the reactor vessel 230. The cracked light hydrocarbon products are thereafter separated from the cracking catalyst using cyclonic separators which may include a primary separator 232 and one or two stages of cyclones 234 in the reactor vessel 230. Product gases exit the reactor vessel 230 through a product outlet 236 to line 238 for transport to a downstream fluid catalytic cracking main fractionation column (not shown) for recovery of product streams such as naphtha and cycle oil. Inevitable side reactions occur in the reactor riser 220 leaving coke deposits on the catalyst that lower catalyst activity. The spent or coked catalyst requires regeneration for further use. Coked catalyst, after separation from the gaseous product hydrocarbon, falls into a stripping section 222 where steam or other inert gas is injected through a nozzle to counter-currently purge any residual hydrocarbon vapor from the coked catalyst. After the stripping operation, the coked catalyst is fed to the catalyst regenerator 240 through a spent catalyst standpipe 224.

The FIGURE depicts a regenerator 240 of the type known as a combustor. However, other types of regenerators are suitable. In the catalyst regenerator 240, a stream of oxygen-containing gas, such as air, is introduced through an air distributor 242 to contact the coked catalyst, burn coke deposited thereon, and provide regenerated catalyst and flue gas. The catalyst regeneration process adds a substantial amount of heat to the catalyst, providing energy to offset the endothermic cracking reactions occurring in the reactor riser 220. Catalyst and air flow upwardly together along a combustor riser 244 located within the catalyst regenerator 240 and, after regeneration, are initially separated by discharge through a disengager 246. Finer separation of the regenerated catalyst and flue gas exiting the disengager 246 is achieved using first and second stage separator cyclones 248 within the catalyst regenerator 240. Catalyst separated from flue gas dispenses through respective dip legs from cyclones 248 while flue gas relatively lighter in catalyst sequentially exits cyclones 248 and exits the regenerator vessel 240 through flue gas outlet 250. Regenerated catalyst is recycled back to the reactor riser 220 through the regenerated catalyst standpipe 216. As a result of the coke burning, the flue gas vapors exiting at the top of the catalyst regenerator 240 through outlet 250 contain CO, $CO_2$ and $H_2O$, along with smaller amounts of other species.

The use of two strippers in the product recovery unit 14 enables operation of the product recovery unit 14 without a fired heater. Only the cold stripped bottoms is further fractionated. A heater less intensive than a fired heater can provide sufficient heater duty for the cold stripped bottoms. The hot stripped bottoms may be directed to a process unit such as a fluid catalytic cracking unit which requires minimal if any preheat. Although two strippers are used instead of one, the apparatus and process counter-intuitively minimize capital and operating cost.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A hydroprocessing process comprising:
   hydroprocessing a hydrocarbon feed in a hydroprocessing reactor to provide a hydroprocessing effluent stream;
   stripping a relatively hot hydroprocessing effluent stream which is a portion of said hydroprocessing effluent stream in a hot stripper to provide a hot stripped stream;
   feeding said hot stripped stream to a fluid catalytic cracking unit; and
   stripping a relatively cold hydroprocessing effluent stream which is a portion of said hydroprocessing effluent stream and a stream from said hot stripper in a cold stripper to provide a cold stripped stream.

2. The hydroprocessing process of claim 1 wherein said stream from said hot stripper is at least a portion of an overhead stream from said hot stripper.

3. The hydroprocessing process of claim 2 further comprising separating an overhead stream of said hot stripper into an off-gas stream and a bottoms stream and feeding said bottoms stream to said cold stripper.

4. The hydroprocessing process of claim 1 further comprising fractionating said cold stripped stream but not the hot stripped stream in a fractionation column.

5. The hydroprocessing process of claim 1 wherein the hydroprocessing reactor is a hydrotreating reactor.

6. The hydroprocessing process of claim 1 wherein a feed to the hydrotreating reactor is a residue feed.

7. The hydroprocessing process of claim 3 further comprising separating a cold overhead stream from said cold stripper in a cold overhead receiver into an off gas stream and a liquid unstabilized naphtha stream.

8. The hydroprocessing process of claim 7 further comprising mixing said off gas stream from said a hot overhead receiver with said off gas stream from said cold overhead receiver.

9. The hydroprocessing process of claim 1 further comprising separating said hydroprocessing effluent stream into said cold hydroprocessing effluent stream and hot hydroprocessing effluent stream.

10. The hydroprocessing process of claim 9 further comprising separating said hydroprocessing effluent stream in a hot separator to provide a hot separator overhead stream comprising a portion of said cold hydroprocessed effluent stream and a hot separator bottoms stream.

11. The hydroprocessing process of claim 10 further comprising separating the hot separator overhead stream in a cold separator to provide a cold separator overhead stream and a cold separator bottoms stream comprising a portion of said cold hydroprocessing effluent stream.

12. The hydroprocessing process of claim 10 further comprising separating the hot separator bottoms stream in a hot flash drum to provide a hot flash overhead stream comprising a portion of said cold hydroprocessed effluent stream and a hot flash bottoms stream comprising the hot hydroprocessing effluent stream.

13. The hydroprocessing process of claim 11 further comprising separating said cold separator bottoms stream in a cold flash drum to provide a cold flash overhead stream and a cold flash bottoms stream, said cold flash bottoms stream comprising said cold hydroprocessed effluent stream.

14. The hydroprocessing process of claim 12 further comprising separating said hot flash overhead stream in a cold flash drum to provide a cold flash overhead stream and a cold flash bottoms stream, said cold flash bottoms stream comprising said cold hydroprocessed effluent stream.

15. A hydroprocessing process comprising:
hydrotreating a hydrocarbon feed in a hydroprocessing reactor to provide a hydroprocessing effluent stream;
stripping a relatively hot hydroprocessing effluent stream which is a portion of said hydroprocessing effluent stream in a hot stripper to provide a hot stripped stream;
stripping a relatively cold hydroprocessing effluent stream which is a portion of said hydroprocessing effluent stream and a stream from said hot stripper in a cold stripper to provide a cold stripped stream;
fluid catalytically cracking said hot stripped stream; and
fractionating said cold stripped stream.

16. A hydroprocessing process comprising:
hydroprocessing a hydrocarbon feed in a hydroprocessing reactor to provide a hydroprocessing effluent stream;
separating said hydroprocessing effluent stream into a cold hydroprocessing effluent stream and a hot hydroprocessing effluent stream including separating said hydroprocessing effluent stream in a hot separator to provide a hot separator overhead stream comprising a portion of a cold hydroprocessed effluent stream and a hot separator bottoms stream;
stripping a hot hydroprocessing effluent stream which is a portion of said hydroprocessing effluent stream in a hot stripper to provide a hot stripped stream; and
stripping said cold hydroprocessing effluent stream which is a portion of said hydroprocessing effluent stream and a stream from said hot stripper in a cold stripper to provide a cold stripped stream.

17. The hydroprocessing process of claim 16 further comprising separating the hot separator overhead stream in a cold separator to provide a cold separator overhead stream and a cold separator bottoms stream comprising said portion of said cold hydroprocessing effluent stream.

18. The hydroprocessing process of claim 16 further comprising separating the hot separator bottoms stream in a hot flash drum to provide a hot flash overhead stream comprising a portion of said cold hydroprocessed effluent stream and a hot flash bottoms stream comprising said hot hydroprocessing effluent stream.

19. The hydroprocessing process of claim 17 further comprising:
separating said hot separator bottoms stream in a hot flash drum to provide a hot flash overhead stream comprising a portion of said cold hydroprocessed effluent stream and a hot flash bottoms stream comprising said hot hydroprocessing effluent stream; and
separating said cold separator bottoms stream and said hot flash overhead stream in a cold flash drum to provide a cold flash overhead stream and a cold flash bottoms stream, said cold flash bottoms stream comprising said cold hydroprocessed effluent stream.

* * * * *